June 20, 1933.  A. Y. DODGE  1,914,490
BRAKE
Filed May 31, 1930
Fig. 1
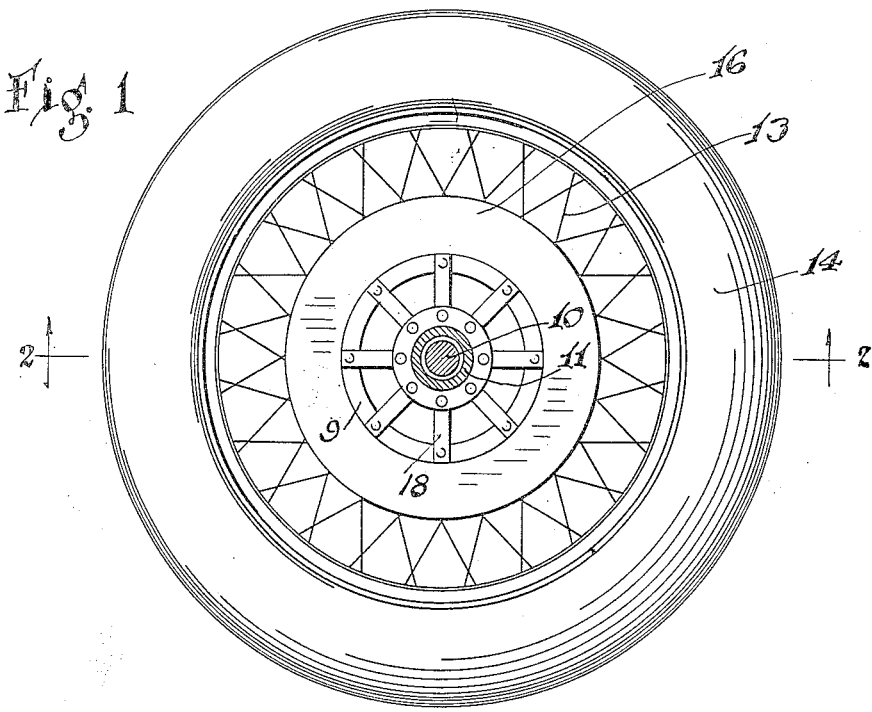
Fig. 2
Fig. 3
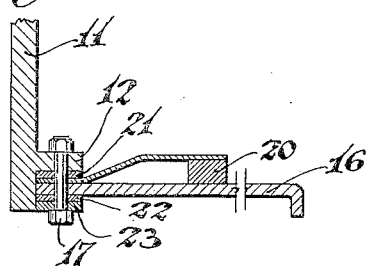
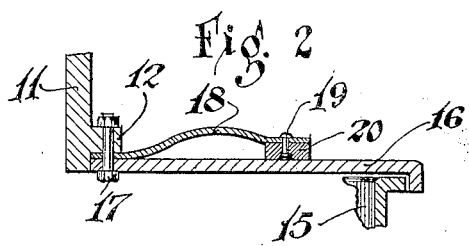
INVENTOR.
Adiel Y. Dodge
BY
J.W. McConkey
ATTORNEY Patented June 20, 1933

1,914,490

UNITED STATES PATENT OFFICE

ADIEL Y. DODGE, OF SOUTH BEND, INDIANA, ASSIGNOR TO BENDIX AVIATION CORPORATION, OF SOUTH BEND, INDIANA, A CORPORATION OF DELAWARE

BRAKE

Application filed May 31, 1930. Serial No. 458,712.

This invention relates to brakes and more particularly to means for checking vibrations therein.

An object of the invention is to prevent the building up of vibrations in the backing plate of a brake.

Another object of the invention is to provide means supported on the axle housing adapted to prevent the building up of audible vibrations in the backing plate of a brake.

Another object of the invention is to prevent the building up of audible vibrations in the backing plate of a brake by a compression member engaging the plate.

A further object of the invention is to prevent the building up of audible vibrations in the backing plate of a brake for motor vehicles by a spring pressed member engaging the plate.

Other objects and advantages of the invention reside in the various combinations hereinafter described and claimed, as will be apparent upon reference to the specification and to the drawing, in which:

Figure 1 is a side elevation of a motor vehicle wheel positioned on an axle, the housing of which supports a brake embodying the invention;

Figure 2 is an enlarged sectional view substantially on line 2—2, Figure 1, but showing a modified form of the invention; and Figure 3 is a modification illustrating an axle housing supporting a backing plate.

Referring to the drawing for more specific details of the invention, 10 represents an axle of a motor vehicle having a conventional axle housing 11 provided with a circumferential flange 12. As shown, a wheel 13 is positioned on the axle 10. The wheel is provided with the usual tire 14, and secured to the wheel in any suitable manner is a brake drum 15.

A backing plate 16 is secured to the flange 12 as by bolts 17. This backing plate supports the brake shoes, not shown, adapted for co-operation with the drum 15. Secured between the flange 12 on the axle housing and the plate 16 as by bolts 17 are spokes or spring members 18 extending radially from the flange 12 or the axle housing 11 and secured to the outer ends of these spring spokes as by rivets 19 are sound-deadening means which may be in the form of an integral ring 9 as shown in Figure 1 or may be in the form of suitable metallic members 20 engaging the plate 16 as shown in Figure 2. The ring 9 and members 20 may be formed of mild steel, copper, lead, or other metal chosen for its sound-deadening properties. The spring spokes 18 are so formed that the sound-deadening means is spring pressed against the backing plate 16, so that any tendency of the plate 16 to vibrate and build up an audible vibration is effectively checked or damped.

In Figure 3, I have shown a further modification of the invention wherein asbestos or other suitable gaskets 21 and 22 are positioned on the bolts 17 on the respective sides of the backing plate 16. A metallic ring 23 also positioned on the bolts 17 serves to more effectively secure the plate and gaskets in position. The gaskets insulate the backing plate 16 from the axle housing 11. This insulation effectively checks or dampens any vibrations imparted to the backing plate through the axle housing and likewise any vibrations built up in the backing plate by the frictional engagement of the shoes with the drum.

While preferred embodiments of the invention have been described, it is to be understood that these are given merely as examples of the underlying principles of the invention and since these may be incorporated in other specific mechanical structures, I do not intend to be limited to those shown, except as such limitations are clearly imposed by the appended claims.

Having thus described the various features of the invention, what I claim as new and desire to secure by Letters Patent is:

1. A brake comprising a backing plate, a member engaging the plate and a spring pressed member retaining the first mentioned member against the plate.

2. A brake comprising a backing plate, means for supporting the backing plate, a member positioned on the plate and a spring pressed member carried by the supporting member retaining the member under pressure against the plate.

3. A brake comprising a backing plate, a ring and means for supporting the ring against the plate including a plurality of springs.

4. A brake comprising a backing plate, a support therefor, a ring engaging the plate, a plurality of radial spring spokes supporting the ring and means for clamping the spokes between the plate and the support.

5. A brake comprising a support having a flange, a backing plate on the support, a plurality of radial spring spokes clamped between the support and the backing plate and a ring secured to the spokes engaging the backing plate.

6. A brake comprising a support having a flange, a backing plate on the flange, means for insulating the backing plate from the flange, a plurality of spring spokes clamped between the backing plate and the flange and a ring supported by the spokes engaging the backing plate.

7. A brake comprising a backing plate and a small mass yieldably held against the plate.

8. A brake comprising a plate and a small mass yieldably held in engagement therewith adapted to produce low pitch reciprocations against the plate.

In testimony whereof, I have hereunto signed my name.

ADIEL Y. DODGE.